Oct. 12, 1965  D. F. ALEXANDER  3,211,894
OVERENERGIZATION CONTROL APPARATUS FOR A COOKING UNIT
Filed Feb. 28, 1963

INVENTOR.
Donald F. Alexander
BY
His Attorney

United States Patent Office

3,211,894
Patented Oct. 12, 1965

3,211,894
OVERENERGIZATION CONTROL APPARATUS
FOR A COOKING UNIT
Donald F. Alexander, Dayton, Ohio, assignor to General
Motors Corporation, Detroit, Mich., a corporation of
Delaware
Filed Feb. 28, 1963, Ser. No. 261,581
5 Claims. (Cl. 219—495)

This invention relates to a domestic appliance and more particularly to an improved cooking unit control for an electric range.

The electric cooking art is interested in achieving a rapid heat up of the surface cooking units on an electric range. Flash heating or overenergization of the heating element for an acceptable time interval has been used for this purpose. For instance, the patent to Vogelsberg 2,666,124, issued January 12, 1954, is representative of control apparatus for electric range cooking units which can be flashed for a predetermined period at the start of a cooking cycle, thereby to raise rapidly the temperature of the cooking unit. Such prior art devices use selected arrangements of bimetallic elements to achieve the selective opening and closing of power circuits. By this invention it is desired to improve over a control so dependent on the calibration and reliability of these bimetal elements.

Accordingly, it is an object of this invention to provide a more reliable control means for overenergizing the resistance element in a surface cooking unit by eliminating bimetal elements from the overenergization circuit.

Another object of this invention is to provide an overenergization circuit using a temperature responsive magnetic ferrite to release from flash.

A further object of this invention is to provide a cooking unit control having means for varying the period of flash or overenergization.

Still another object of this invention is to provide an overenergization control for an electric cooking unit including a pilot circuit to control overenergization, said pilot circuit being operable on control currents and/or voltages substantially less than those required to operate the surface cooking unit.

Another object of this invention is to provide an overenergization control for an electrical cooking unit using a magnetic solid-state control element to regulate overenergization without moving parts friction.

Further objects and advantages of the present invention will be apparent from the following description, reference being had to the accompanying drawings wherein preferred embodiments of the present invention are clearly shown.

Figure 1:
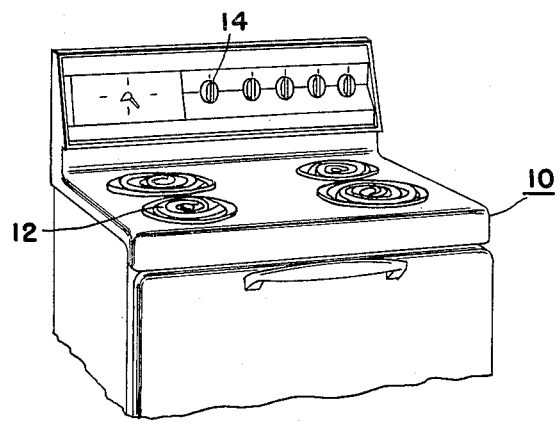
FIGURE 1 is a fragmentary perspective view of an electric range provided with this invention.

In accordance with this invention and with reference to FIGURE 1, an electric range 10 is shown comprised of a plurality of surface cooking units, one of which is a cooking unit 12 adapted to be overenergized at flash voltage for a period of flash heat. The cooking unit 12 may be controlled from the console of the range by a control knob 14 thereon which is operative to select an input at normal voltage for the cooking unit.

In order to achieve a rapid heat up of the cooking unit 12 to temperatures which will be quickly effective to heat or to cook food in a utensil placed on the unit, the cooking unit 12 is energized on high or flash voltage for a short period of time. This period of overenergization overcomes the mass of the unit and rapidly brings the surface thereof to high temperature. Prior art devices such as taught in the Vogelsberg patent, cited hereinabove, include a plurality of pivotable bimetals selectively to connect the cooking unit across the desired line voltages.

When a main line switch means 15 is closed, this invention selectively connects the cooking unit 12 for operation on either 236-volt current or 118-volt current by means of a flash heat device or overenergization control means 16. The overenergization control 16 is comprised of a ferrite or selectively magnetic means 18 connected between a domestic power supply $L_1$ and a neutral N. An armature means 20 is pivotally connected adjacent to the ferrite 18 in a manner to be magnetically attracted to the ferrite 18 when the ferrite is magnetic at room temperature and adapted to be released when the ferrite becomes demagnetized at some higher temperature. The armature means 20 is mechanically connected to a cooking unit power supply switch 22 which is operable between a high voltage contact 24 and a low voltage contact 26. In order to provide a force for movement of the power supply switch 22, a spring 28 may be included to move rapidly the armature means 20 against a stop 30 when the ferrite 18 is demagnetized.

The ferrite 18 is a substance which has changeable magnetic properties when heated. The temperature at which the ferrite 18 changes from magnetic to nonmagnetic is known as the Curie point. The Curie point is the temperature at which there is a transition in a substance in one phase to another of markedly different magnetic properties—in other words, the temperature at which there is a transition between the ferro-magnetic and paramagnetic phases. Thus, it can be seen that the ferrite 18 will attract the armature 20 so long as the ferrite temperature remains below the Curie point for the substance selected. Above the Curie point, the ferrite 18 will release the armature to permit movement of the power supply switch from its high voltage connection to its low voltage connection, thereby terminating the period of overenergization of the cooking unit 12 and establishing a low voltage input controlled run condition for the cooking unit. In this regard it should be understood that the main line switch means 15 may be of the infinite heat variety taught in the aforesaid Vogelsberg patent.

Upon cooling, the ferrite 18 will regain its magnetic properties and may be adapted to reattract the armature 20, thereby moving the power supply switch 22 back to its high voltage contact 24 after the switch 15 is opened by turning off the control knob 14. It is also within the purview of this invention to provide a mechanical connection represented by 32 between the main line switch 15 and the armature 20 to reset the armature by mechanical means in accordance with the skill of the art.

One of the features of this invention is the provision for a flash or overenergization period, the duration of which is variable. For this purpose, a variable resistor 34 is placed in series with the ferrite 18. Thus, the rate of self-heating in the ferrite 18 is controllable through the resistor 34. The more rapidly the ferrite 18 heats to a point above the Curie point, the shorter will be the period of overenergization.

Figure 2:
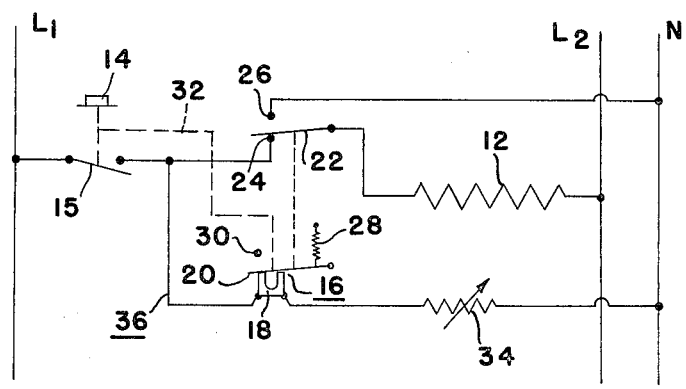
FIGURE 2 is a schematic wiring diagram of the overenergization control of this invention showing a self-heated control element.

Although the pilot circuit 36 including the ferrite and shown in FIGURE 2 is connected across 118 volts, it should be understood that very small control current could be used to actuate the armature 22 merely by selecting a substance 18 whose Curie point magnetic characteristics are obtainable with the heating capacities available on the small pilot currents selected.

Figure 3:
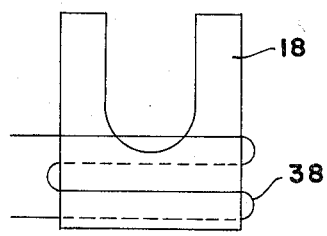
FIGURES 3 and 4 illustrate alternate arrangements wherein the control element is heated by a separate heater.
Figure 4:
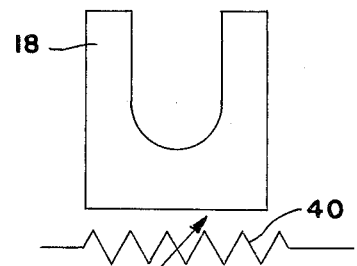

The foregoing description was concerned with a self-heated ferrite 18 wherein the heating response depends solely on the characteristic of the substance selected. Some ferrite elements may require too much current to self-heat above the Curie point. In order to achieve additional flexibility, the ferrite 18 in FIGURE 3 may be wrapped with a coil 38 of resistance wire which is energized in a manner to provide the rate of heating desired in the ferrite. On the other hand, FIGURE 4 illustrates the ferrite 18 heated by an adjustable or variable resistor or heater 40 in heat transfer relationship thereto, thereby embodying a control to vary the duration of the overenergization.

It should now be seen that an improved overenergization control has been devised for use with electric surface cooking units. The use of ferrite provides a more reliable flash heat control than that available in the prior art devices using bimetals.

While the embodiments of the present invention as herein disclosed constitute preferred forms, it is to be understand that other forms might be adopted.

What is claimed is as follows:

1. An overenergization control for a surface cooking unit adapted to connect said unit either a high or low voltage power supply and comprising power supply switch means connected to said surface cooking unit and selectively movable between a high voltage power supply contact and a low voltage power supply contact, armature means connected to said power supply switch means for actuating said power supply switch means and movable between a first position to place said power supply switch means in power supply receiving relationship with said high voltage power supply contact and a second position to place said power supply switch means in power supply receiving relationship with said low voltage power supply contact, main line switch means closable for supplying power to said power supply switch means when said armature means is in said first position and openable to terminate the supply of power and to position said armature means in said first position, selectively magnetic means in selectively attracting relationship to said armature and having a magnetic property when the temperature thereof is below a predetermined temperature and having a nonmagnetic property when the temperature thereof is above said predetermined value, and circuit means including said selectively magnetic means in power supply receiving relationship therewith and energizable concurrently with said surface cooking unit when said power supply switch means is in power supply receiving relationship with said high voltage power supply contact and said main line switch means is closed thereby to heat said selectively magnetic means by the supply of power therethrough above said predetermined temperature to effect the movement of said armature from said first position to said second position after a predetermined time interval, said circuit means including variable resistance means in series with said selectively magnetic means for altering said said predetermined time interval.

2. An overenergization control for a surface cooking unit adapted to be connected on either high or low voltage and comprising power supply switch means connected to said surface cooking unit and selectively movable between a high voltage power supply contact and a low voltage power supply contact, armature means connected to said power supply switch means for actuating said power supply switch means and movable between a first position to place said power supply switch means in power supply receiving relationship with said high voltage power supply contact and a second position to place said power supply switch means in power supply receiving relationship with said low voltage power supply contact, selectively magnetic means in selectively attracting relationship to said armature and having a magnetic property when the temperature thereof is below a predetermined temperature and having a nonmagnetic property when the temperature thereof is above said predetermined value, and circuit means including said selectively magnetic means in power supply receiving relationship therewith and energizable concurrently with said surface cooking unit thereby to heat said selectively magnetic means by the supply of power therethrough above said predetermined temperature to effect the movement of said armature from said first position to said second position after a predetermined time interval.

3. An overenergization control for a surface cooking unit adapted to be connected on either high or low voltage and comprising power supply switch means connected to said surface cooking unit and selectively movable between a high voltage power supply contact and a low voltage power supply contact, armature means connected to said power supply switch means for actuating said power supply switch means and movable between a first position to place said power supply switch means in power supply receiving relationship with said high voltage power supply contact and a second position to place said power supply switch means in power supply receiving relationship with said low voltage power supply contact, selectively magnetic means in selectively attracting relationship to said armature and having a magnetic property when the temperature thereof is below a predetermined temperature and having a nonmagnetic property when the temperature thereof is above said predetermined value, and circuit means including said selectively magnetic means in power supply receiving relationship therewith and energizable concurrently with said surface cooking unit when said power supply switch means is in power supply receiving relationship with said high voltage power supply contact thereby to heat said selectively magnetic means by the supply of power therethrough above said predetermined temperature to effect the movement of said armature from said first position to said second position after a predetermined time interval, said circuit means including variable resistance means for altering said predetermined time interval.

4. In a system for effecting overenergization of an electrical surface cooking unit from an electrical supply line to heat said unit rapidly to a selected temperature, manually adjustable means for selecting an input for said surface cooking unit, means for effecting overenergization of said surface cooking unit, and overenergization control means for timing the period of overenergization, said overenergization control means including actuating means connected to said means for effecting overenergization to initiate and terminate said period of overenergization, said actuating means including temperature responsive magnetic means connectable for electrical supply therethrough and normally magnetic at room temperature to initiate said period of overenergization and energizable when connected to said electrical supply line for self heating with said surface cooking unit to a predetermined temperature above said room temperature where said temperature responsive magnetic means becomes nonmagnetic to terminate said period of overenergization, the time for said temperature responsive magnetic means to heat from said room temperature to said predetermined temperature being a measure of the duration of said period of overenergization.

5. In a system for effecting overenergization of an electrical surface cooking unit from an electrical supply line to heat said unit rapidly to a selected temperature, adjustable means for selecting an input for said surface cooking unit, means for effecting overenergization of said surface cooking unit, and overenergization control means for timing the period of overenergization, said overenergization control means including actuating means connected to said means for effecting overenergization to initiate and terminate said period of overenergization, said actuating means including temperature responsive magnetic means remote from said surface cooking unit and in non-heat transfer relationship therewith, said temperature responsive magnetic means being normally magnetic at room temperature to initiate said period of overenergization and heatable to a predetermined temperature above said room temperature where said temperature responsive magnetic means becomes non-magnetic to terminate said period of overenergization, the time for said temperature responsive magnetic means to heat from said room temperature to said predetermined temperature being solely a measure of the duration of said period of overenergization, said actuating means including heating means connectable for electrical supply therethrough and in heat transfer relationship with said temperature responsive magnetic means whenever said adjustable means selects an input for said surface cooking unit, and said actuating means including means for controlling said heating means to regulate the rate at which said temperature responsive magnetic means is heated.

References Cited by the Examiner

UNITED STATES PATENTS

| 2,207,871 | 7/40 | Myers | 219—495 |
| 2,666,124 | 1/54 | Vogelsberg | 219—489 |
| 3,009,047 | 11/61 | Simmons | 219—495 |
| 3,015,710 | 1/62 | Kelly | 219—495 |

RICHARD M. WOOD, *Primary Examiner.*